March 9, 1965  C. B. KEPHART, JR  3,172,306
CHAIN SAW SHARPENING DEVICE
Filed Dec. 26, 1963  2 Sheets-Sheet 1
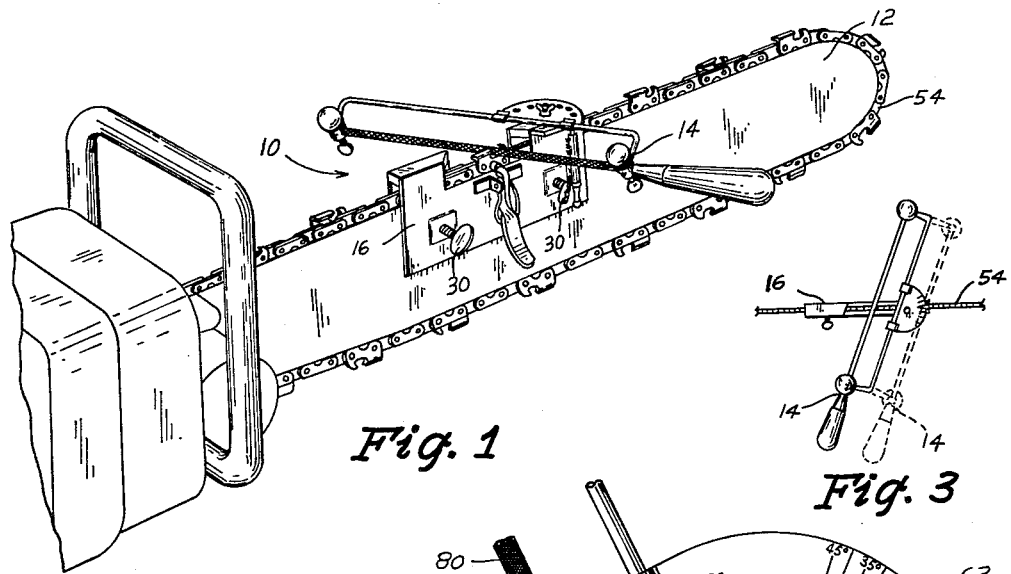
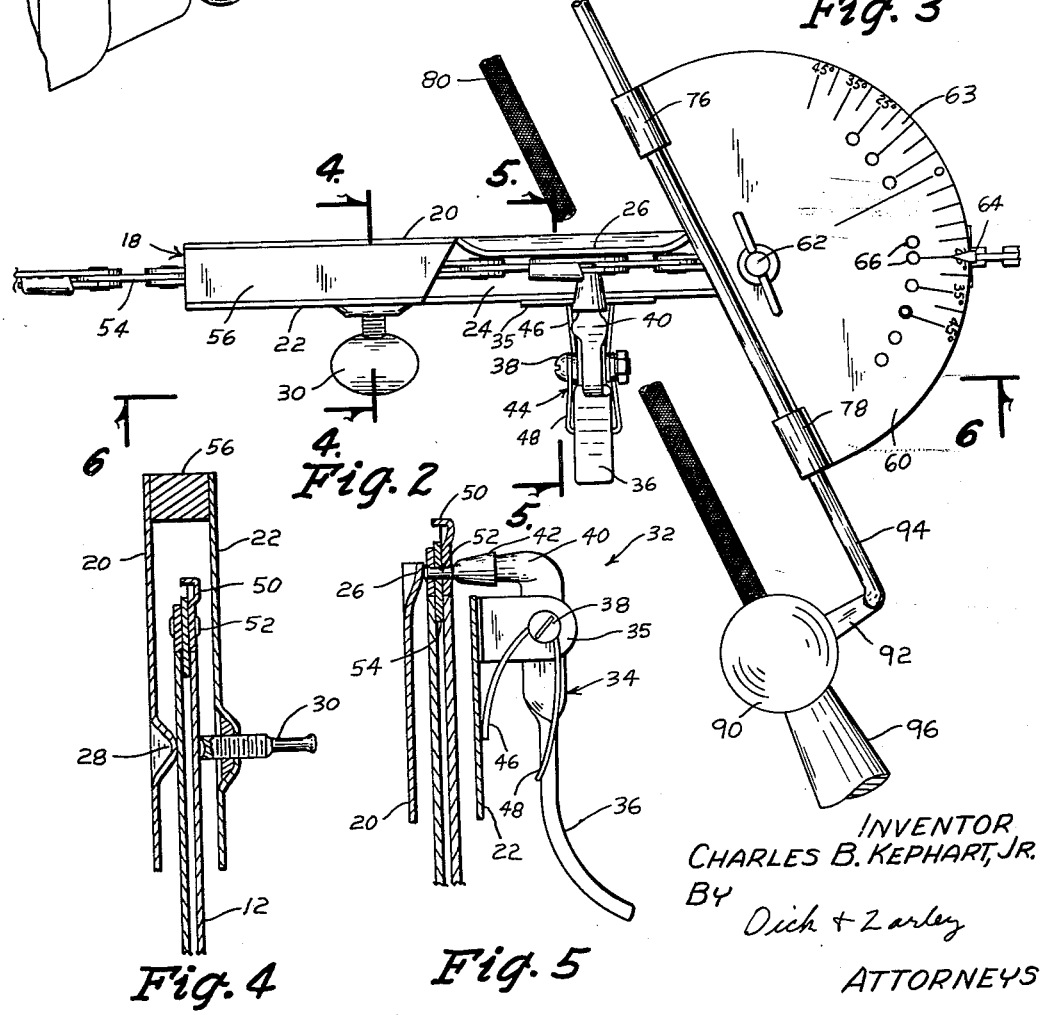
INVENTOR
CHARLES B. KEPHART, JR.
BY Dick & Zarley
ATTORNEYS March 9, 1965
C. B. KEPHART, JR
3,172,306
CHAIN SAW SHARPENING DEVICE
Filed Dec. 26, 1963
2 Sheets-Sheet 2
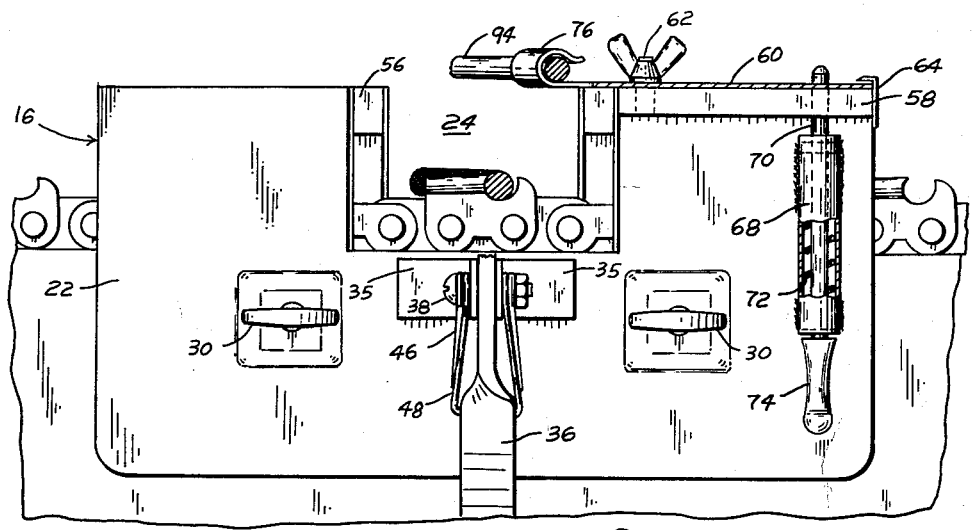
Fig. 6
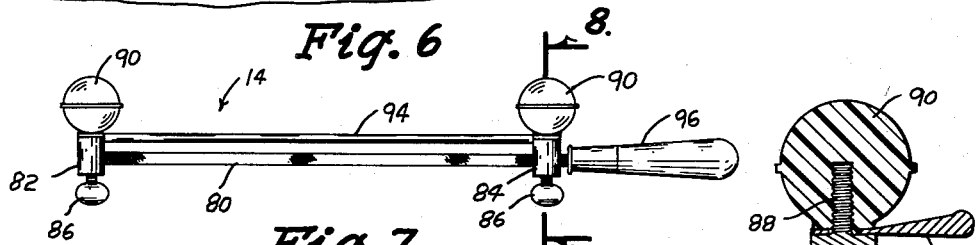
Fig. 7
Fig. 8
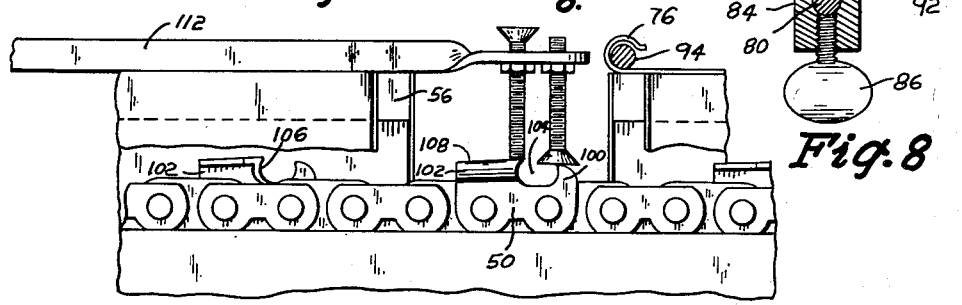
Fig. 9
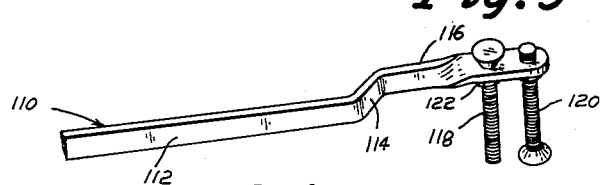
Fig. 10
INVENTOR
CHARLES B. KEPHART, JR.
BY
Dick & Zarley
ATTORNEYS United States Patent Office 3,172,306
Patented Mar. 9, 1965

3,172,306
CHAIN SAW SHARPENING DEVICE
Charles B. Kephart, Jr., 1620 18th St.,
West Des Moines, Iowa
Filed Dec. 26, 1963, Ser. No. 333,375
6 Claims. (Cl. 76—36)

This invention relates to chain saw sharpening devices and specifically to devices for filing the teeth of chain saws.

One of the objects of this invention is to provide a chain saw sharpening device having a file holder which will firmly grip the saw-tooth being sharpened.

An object of this invention is to provide a file holder which will positively hold the file unit at the desired angle relative to the saw-tooth.

Another object of this invention is to provide a chain saw sharpening device having a file holder which may be quickly and readily secured to and removed from the longitudinal edge of a chain saw.

A still further object of this invention is to provide a chain saw sharpening device having a file unit which has handle portions for conveniently moving the file unit along the cutting edge of the saw-teeth.

A still further object of this invention is to provide a chain saw sharpening device including a file holder and a gauge for determining the relative depth or height of different portions of a saw-tooth.

A further object of this invention is to provide a chain saw sharpening device which is simple in design, economical to manufacture and refined in appearance.

This invention consists in the construction, arrangements, and combination, of the various parts of the device, whereby the objects contemplated are attained as hereinafter more fully set forth, specifically pointed out in the claims, and illustrated in the accompanying drawings, in which:

FIG. 1 is a perspective view of a chain saw with the chain saw sharpening device mounted thereon;

FIG. 2 is a fragmentary top plan view of the chain saw sharpening device in FIG. 1 showing in particular the manner in which the saw-tooth being sharpened is clamped and held against movement;

FIG. 3 is a top plan view similar to FIG. 2 but showing in particular the file unit rotated relative to the longitudinal edge of the saw-tooth to be in position to sharpen the cutting edge of alternate saw-teeth; FIG. 3 also shows in dash lines the file unit pivoted on the file holder out of its sharpening position;

FIG. 4 is an elevational cross-sectional view of the file holder taken along line 4—4 in FIG. 2;

FIG. 5 is an elevational cross-sectional view of the file holder taken along line 5—5 in FIG. 2;

FIG. 6 is a side elevational view of the chain saw sharpening device showing the saw unit in cross-section;

FIG. 7 is a side elevation view of the file unit;

FIG. 8 is a cross-sectional elevational view taken along line 8—8 in FIG. 7 showing in particular the knob handles and the manner in which they are secured to the file element of the file unit;

FIG. 9 is a fragmentary side elevational view of the file holder and also showing a gauge for determining the relative height of points along a saw-tooth; and FIG. 10 is a perspective view of the depth gauge device shown in FIG. 9.

In FIG. 1 of the drawings the saw sharpening device of this invention is referred to generally by the reference numeral 10. It is shown mounted on the longitudinal edge of the chain saw bar 12. A file unit 14 is included in the saw sharpening device 10 and is slidably and rotatably secured to the saw holder assembly 16.

Referring to FIGS. 1 and 2, it is seen that the file holder 16 is comprised of an inverted U-shaped channel member having a base 18 and opposite side walls 20 and 22. A section of the base 18 and the side walls 20 and 22 have been removed intermediate the ends of the channel and thereby form an opening or recess 24 through the channel. A portion 26 of the wall 20 has been swaged inwardly into the opening 24 and extends longitudinally substantially the length of the opening. Similarly, portions 28 on opposite sides of the opening 24 in the wall 20 have been swaged inwardly towards the opposite channel wall 22 (FIG. 4).

A pair of thumb screws (FIG. 4) are threadably mounted in the wall 22 opposite each of the swage portions 28 and are adapted to engage the bar 12 of the chain saw thereby securely clamping the bar 12 between the swage portions 28 and the thumb screws 30.

Between the thumb screws 30 and adjacent the opening 24, a finger assembly 32 is mounted on the side wall 22. The finger assembly 32 includes a finger member 34 which is pivotally connected in a vertical plane between a pair of support plates 35 by a bolt 38. The finger member 34 also includes a handle portion 36 which extends downwardly from the support elements 35. A plunger portion 40 is provided above the support elements 35 and is adapted to pivot into the opening 24 in direct alignment with the swage portion 26 in the opposite wall 20. The plunger portion 40 is rounded on the outer end and has a cap 42 of any suitable material such as rubber, plastic or the like. The finger member 34 is normally biased into the opening 24 by a spring 44 which is coiled at its intermediate portion around the bolt 38 and has U-shaped portions 46 and 48 bearing against the side wall 22 and the inside surface of the handle portion 36 respectively. Thus it is seen that by the proper placement of the file holder channel 16 on the saw bar 12, a saw-tooth 50 may be clamped between the swage portion 26 and the plunger 40. As shown in FIG. 5, the plunger 40 and the swage portion 26 engage a rivet 52 holding the saw-tooth 50 onto the saw chain 54.

By forming the opening 24 in the file holder 16 two base portions 56 and 58 are provided on opposite sides thereof. A semi-circular protractor plate member 60 is rotatably mounted by a bolt 62 to the base portion 58 (FIGS. 2 and 6). The rounded edge of the protractor is provided with angle markings 63 and a pointer 64 is mounted at the outer end of the base portion 58 to read on the angle markings 63. Along a circular line concentric about the bolt 62 are a plurality of openings or holes 66 formed in the protractor plate 60. The rounded edge of the protractor 60 is also concentric about the bolt 62. A spring loaded plunger assembly 68 (FIG. 6) is mounted on the side wall 22 and includes a pin 70 which is normally biased upwardly by spring 72 into engagement with one of the protractor openings 66. A handle portion 74 is provided on the lower end of the plunger assembly 68 to operate the pin 70.

Opposite the rounded peripheral edge of the protractor 60 is a straight edge which is provided with a pair of clip elements 76 and 78 for slidably and rotatably supporting the file unit 14 as will hereinafter be described in greater detail.

The file unit 14 shown separately in FIGS. 7 and 8 includes an elongated round file element 80 provided with collar elements 82 and 84 at each of its ends. Thumb screws 86 are threadably received in the lower side of the collars and are adapted to engage the file element 80 to hold it against movement relative to the collars. A stud element 88 extends vertically upwardly from the collars and threadably engages a knob 90. Between the top of the collars 82 and 84 and the respective knobs 90 are leg portions 92 which embrace the studs 88 and are connected to opposite ends of a support rod 94 cylindrical in cross-section. Thus, as seen in FIG. 7, the support rod 94 is disposed above and behind the parallel file element 80. The rod 94 is adapted to be slidably and rotatably received in the clips 76 and 78 (FIG. 2) whereby the file unit may be moved longitudinally of the protractor 60 in filing a saw-tooth 50 or be pivoted upwardly on top of the protractor 60 as shown by the dash lines in FIG. 3 when not in use. Additionally, a third handle member 96 is provided on one end of the file element 80 and extends outwardly in alignment therewith.

Each of the teeth elements 50 (FIG. 9) comprise a forward guide portion 100 and a cutting portion 102 separated from each other by a slot 104. The cutting portion 102 is provided with a transversely tapered cutting edge 106 and a rearwardly tapering top edge 108. It is desired that the proper angle of the cutting edge 106 be maintained at all times and thus this is accomplished by the use of the protractor member 60 which enables the user to maintain the appropriate angle between the file element 80 and the cutting edge 106. Moreover, it is important that the slope of the top edge 108 be maintained uniform for all of the saw-teeth 50. Additionally, as shown in FIG. 9, the top point on the guide 100 should be a predetermined distance below the top forward point on the cutting portion upper surface 108. To accomplish uniformity in the depth between the cutting portion 102 and the guide portion 100, a depth gauge 110 is used as shown in FIGS. 9 and 10. It comprises an elongated main body member 112 and angularly offset integral portion 114 which terminates in a third portion 116 extending parallel to the main body portion 112. However, the third portion 116 is twisted at its outer end 90 degrees and threadably receives a pair of bolt members 118 and 120. Each of the bolt member 118 and 120 are threaded in opposite directions into the portion 116 and lock nuts 122 are provided to fixedly secure the bolt members 118 and 120 in a desired relative position to the gauge portion 116. As shown in FIG. 9, the main body portion 112 is placed in mating engagement on the top face of the holder base portion 56 and the bolt members 118 and 120 extend into the holder opening 24 into contact with the highest point on the toothcutting portion 102 and the guide portion 100. Thus it is seen that the difference in height between these portions may be established by presetting the length of the bolts 118 and 120.

To sharpen the saw-teeth 50 of the chain saw, the holder 16 is placed over the saw bar 12 and the chain 54 so that a selected tooth 50 is exposed within the opening 24 in the holder 16. The vertical position of the holder 16 is adjusted to the point where the plunger 40 on the finger 34 is in alignment with the main body portion such as the rivet of the selected tooth 50. As is apparent in FIG. 5 and FIG. 2, the swage portion 26 extends along the full length of the tooth 50 thereby cooperating with the plunger 40 to firmly clamp the tooth therebetween. When this adjustment has been made then the thumb screws 30 are tightened against the saw bar 12 wherein it is clamped between the thumb screws 30 and the swaged portions 28 (FIG. 4). Next, the protractor 60 is set at the appropriate angle by pulling the pin 70 downwardly by the handle 74 and moving the pin then into engagement with one of the holes 66 in the protractor 60. Since the protractor 60 serves as a support for the file unit 14 the spring loaded pin assembly 68 will positively hold the file unit 14 in the desired angular relationship with the saw-tooth cutting edge 106. The operator may place each of his hands on the two knobs 90 carried by the file unit 14 and move the file element 80 back and forth against the saw-tooth cutting edge 106. After the saw-tooth 50 has been sharpened, the finger 34 is moved out of engagement with the saw-tooth, so that the chain 54 may be advanced to the next saw-tooth and the same operation is again repeated. If the very next saw-tooth is to be sharpened, the angle of the file 80 will have to be reversed with respect to the tooth 50 since each of the cutting edges 106 of the teeth 50 taper in opposite directions as seen in FIG. 9. However, the file unit 14 may be left in its initial angular position by merely advancing the chain 54 two saw-teeth since the second saw-tooth will have the same taper to its cutting edge 106 as the first tooth sharpened. When advancing the chain 54, obviously the file element 80 is moved out of the opening 24 by rotating the saw unit 14 about the rod 94 pivotally secured to the protractor 60 by the spring clips 76 and 78.

Some changes may be made in the construction and arrangement of my chain saw sharpening device without departing from the real spirit and purpose of my invention, and it is my intention to cover by my claims, any modified forms of structure or use of mechanical equivalents which may be reasonably included within their scope.

I claim:

1. A file holder for use in sharpening the beveled cutting edges of saw chain teeth disposed along a longitudinal edge of a chain saw, said holder comprising, an elongated channel member adapted for receiving the longitudinal edge of the chain saw therein, said channel member having a pair of side walls and base portions at each end of said channel member interconnecting said side walls and an opening for exposing a tooth disposed in said channel member, said opening being between said base portions, and a manually actuated finger member pivotally secured to the outside of one of said side walls of said channel member, said finger having a plunger portion adapted to extend into said opening and bear against said tooth, said channel member being provided with means opposite said plunger portion, said means being adapted to bear against one side of said saw tooth while the plunger portion bears against the other side to hold said tooth firmly for sharpening.

2. A file holder for use in sharpening the beveled cutting edges of saw chain teeth disposed along a longitudinal edge of a chain saw, said holder comprising, an elongated channel member adapted for receiving the longitudinal edge of the chain saw therein, the walls of said channel member being spaced apart a greater distance than the thickness of said edge of said chain saw, a portion of one wall being deformed inwardly towards the other wall adjacent the base of said channel member, said channel member having a pair of side walls and base portions at each end of said channel member interconnecting said side walls and an opening for exposing a tooth disposed in said channel member said opening being between said base portions, a manually actuated finger member pivotally secured to the outside of said other wall of said channel member, said finger having a plunger portion adapted to extend into said opening and bear against said tooth, said wall portion adapted to bear against the opposite side of said tooth and thereby hold said tooth firmly therebetween for sharpening, and a spring means adapted to bias said plunger into said opening in said channel.

3. A file holder for use in sharpening the beveled cutting edges of saw chain teeth disposed along a longitudinal edge of a chain saw, said holder comprising, an elongated channel member adapted for receiving the longitudinal edge of the chain saw therein, the walls of said channel member being spaced apart a greater distance than the thickness of said edge of said chain saw, a portion of one wall being deformed inwardly towards the other wall adjacent the base of said channel member, a second and third portion deformed inwardly on opposite sides of said first portion in one of said walls.

said channel member having a pair of side walls and base portions at each end of said channel member interconnecting said side walls and an opening for exposing a toothed disposed in said channel member said opening being between said base portions, a spring manually actuated finger member pivotally secured to said other wall of said channel member, said finger having a plunger portion adapted to extend into said opening and bear against said tooth, said wall portion adapted to bear against the opposite side of said tooth and thereby hold said tooth firmly therebetween for sharpening, and a pair of adjustable means on the opposite channel wall from said second and third deformed portions, said adjustable means adapted to bear against said chain saw to hold it firmly against said second and third portions of said one wall and thereby clamp said channel member to said chain saw.

4. A file holder for use in sharpening the beveled cutting edges of saw chain teeth disposed along a longitudinal edge of a chain saw, said holder comprising, an inverted U-shaped channel member adapted to straddle said chain saw with the side walls of said channel member on opposite sides thereof and the base being disposed adjacent the longitudinal edge of the chain saw, said channel base and side walls having an elongated opening formed therein intermediate the ends of said channel member resulting in said base having a portion at each end of said channel member and a tooth on said chain saw adapted to be exposed through said opening, a manually actuated finger member pivotally secured to the outside face of one of said side walls, a plunger portion on one end of said finger member adapted to be received in said opening in said channel and bear against said saw-tooth, means on the other side wall opposite said plunger portion adapted to bear against said saw-tooth to oppose said plunger portion and thereby clamp said saw-tooth therebetween, means for biasing the plunger portion on the finger into engagement with said saw-tooth, a protractor member rotatably secured to one of said base portions adjacent said opening, means on said protractor member adapted to slidably support a file unit, said protractor member being rounded along one peripheral edge and having a plurality of spaced apart openings extending therethrough along said rounded peripheral edge, said rounded edge and said openings being concentrically disposed about the pivotal connection between said protractor and said base portion, and a spring loaded locking element secured to said channel member below said protractor member and disposed in a plane normal to the plane of said protractor member, said spring loaded locking element adapted to be selectively received in said openings in said protractor member to positively hold said protractor at a desired angle relative to said channel member.

5. In a chain saw sharpening device, comprising, an inverted U-shaped channel member adapted to straddle said chain saw with the side walls of said channel member on opposite sides thereof and the base being disposed adjacent the longitudinal edge of the chain saw, said channel base and side walls having an elongated opening formed therein adapted to expose a tooth on a chain saw and resulting in a base portion at each end of said channel member, a manually actuated finger member pivotally secured to the outside face of one of said side walls, a plunger portion on one end of said finger member adapted to be received in said opening in said channel and bear against said saw-tooth, means on the other side wall opposite said plunger portion adapted to bear against said saw-tooth to oppose said plunger portion and thereby clamp said saw-tooth therebetween, means for biasing the plunger portion on the finger into engagement with said saw-tooth, a protractor member rotatably secured to one of said base portions adjacent said opening, means on said protractor member adapted to slidably support a file unit, said file unit including an elongated file element, a collar element embracing each end of said file element, a set screw means in said collar element and adapted to lockingly engage said file element, a knob member secured to said collar element for manually moving said file unit, an elongated support member secured at each of its ends to said collar elements, said elongated support member adapted to engage said means on said protractor for slidably supporting said file unit.

6. A file holder for use in sharpening the beveled cutting edges of saw chain teeth disposed along a longitudinal edge of a chain saw, said holder comprising, an elongated channel member adapted for receiving the longitudinal edge of the chain saw therein, the walls of said channel member being spaced apart a greater distance than the thickness of said edge of said chain saw, said channel member having a pair of side walls and base portions at each end of said channel member interconnecting said side walls and having an opening for exposing a tooth disposed in said channel member, said opening being between said base portions, a manually actuated finger member pivotally secured to the outside of said other wall of said channel member, said finger having a plunger portion adapted to extend into said opening and bear against said tooth, said channel member being provided with bearing means opposite said plunger portion, said bearing means being adapted to bear against one side of said saw tooth while the plunger portion bears against the other side to hold said tooth firmly therebetween for sharpening, and spring means adapted to bias said plunger into said opening in said channel.

References Cited by the Examiner

UNITED STATES PATENTS

| | | | |
|---|---|---|---|
| 934,510 | 9/09 | Edwards | 76—31 |
| 2,459,233 | 1/49 | Mall | 76—25 |
| 2,736,216 | 2/56 | Paradis et al. | 76—25 |
| 2,799,309 | 7/57 | Olesen | 145—35 |
| 2,818,752 | 1/58 | Granberg | 76—25 |
| 3,024,670 | 3/62 | Smith | 76—31 |

GRANVILLE Y. CUSTER, JR., *Primary Examiner.*